(12) United States Patent
Ikeda

(10) Patent No.: US 8,493,317 B2
(45) Date of Patent: Jul. 23, 2013

(54) REFLECTION TYPE DISPLAY APPARATUS AND DRIVING METHOD THEREOF

(75) Inventor: Hajime Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 12/170,540

(22) Filed: Jul. 10, 2008

(65) Prior Publication Data

US 2009/0021500 A1 Jan. 22, 2009

(30) Foreign Application Priority Data

Jul. 18, 2007 (JP) .................................. 2007-187105

(51) Int. Cl.
*G06F 3/038* (2013.01)

(52) U.S. Cl.
USPC ............. 345/107; 345/84; 345/204; 359/267; 359/269; 359/296

(58) Field of Classification Search
USPC 345/60, 84–86, 106–107, 204; 359/252–253, 359/267–274, 296
See application file for complete search history.

(56) References Cited

U.S. PATENT DOCUMENTS

| 6,113,810 | A  | * | 9/2000  | Hou et al. ..................... 252/572 |
| 7,474,301 | B2 |   | 1/2009  | Arai et al. |
| 7,859,527 | B2 |   | 12/2010 | Hirota et al. |
| 2003/0167915 | A1 | * | 9/2003  | Knoll ............................... 91/461 |
| 2003/0218791 | A1 | * | 11/2003 | Okura et al. ................... 359/267 |
| 2006/0152438 | A1 |   | 7/2006  | Tanaka ............................ 345/48 |
| 2006/0170665 | A1 | * | 8/2006  | Morita et al. ................. 345/204 |
| 2007/0236768 | A1 | * | 10/2007 | Kawahara et al. ............ 359/237 |
| 2007/0296690 | A1 | * | 12/2007 | Nagasaki ...................... 345/107 |

FOREIGN PATENT DOCUMENTS

| JP | 11-101994 | | 4/1999 |
| JP | 2001059979 | A | 3/2001 |
| JP | 2003511719 | A | 3/2003 |
| JP | 2004054221 | A | 2/2004 |
| JP | 2004-170850 | | 6/2004 |
| JP | 20044286825 | A | 10/2004 |
| JP | 2005122110 | A | 5/2005 |
| JP | 2007017735 | A | 1/2007 |
| WO | 01/25845 | A1 | 4/2001 |

* cited by examiner

*Primary Examiner* — Lun-Yi Lao
*Assistant Examiner* — Sosina Abebe
(74) *Attorney, Agent, or Firm* — Fitzpatrick, Cella, Harper & Scinto

(57) ABSTRACT

A reflection type display apparatus includes a light modulating layer having a first electrode having a light transmitting property on which an electroplating can be deposited, a second electrode disposed, in opposition to the first electrode, on a reflecting plate for reflecting light of a certain wavelength band, and an electrolytic solution containing a metal ion arranged in contact with the first and second electrodes. According to a density of current at an interface between the first electrode and the electrolytic solution, the light modulating layer controls a light transmitting ratio and a reflection ratio of the electroplating. In addition, a control unit sets a direction and the density of the current for depositing the electroplating of several colors.

10 Claims, 7 Drawing Sheets

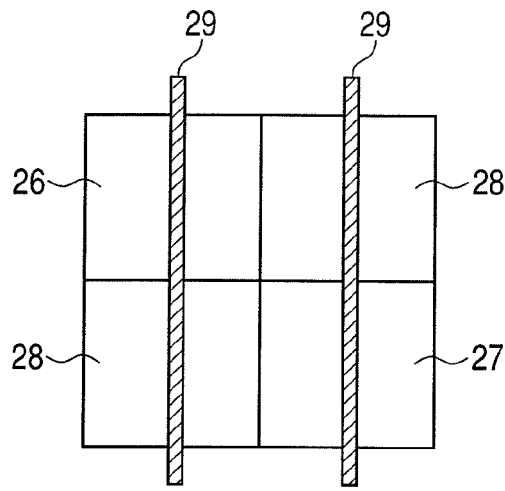
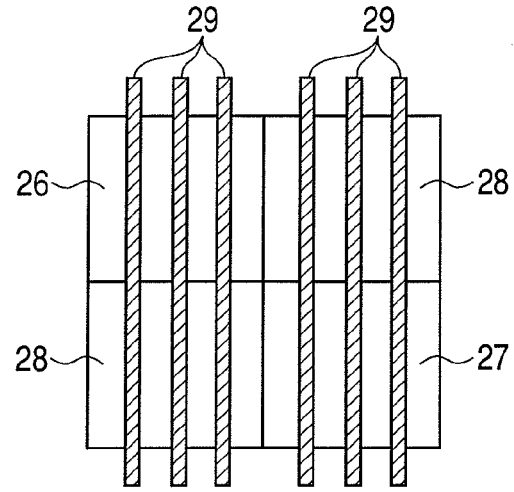
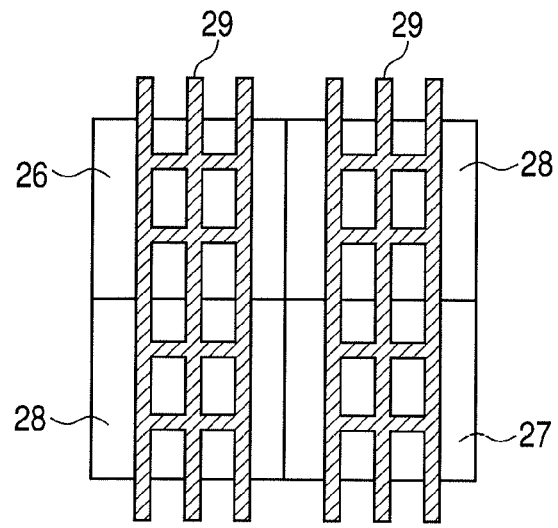
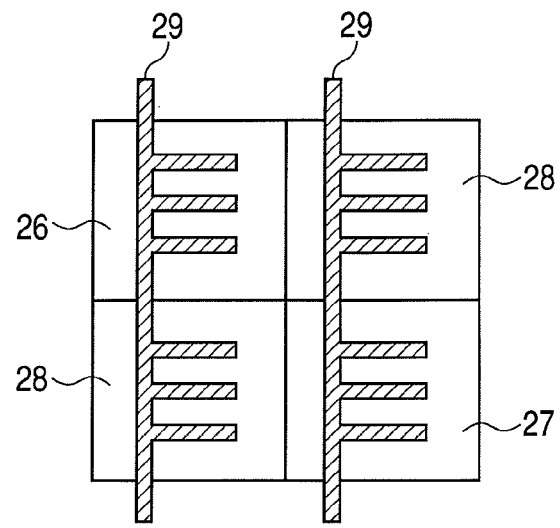

REFLECTION TYPE DISPLAY APPARATUS AND DRIVING METHOD THEREOF

BACKGROUND OF THE INVENTION

1. Field of the Invention

The present invention relates to a reflection type display apparatus and a driving method thereof and, more particularly, to a reflection type display apparatus and a driving method thereof using electroplating for light modulation.

2. Description of the Related Art

Development of electronic paper as display apparatuses having a high visually recognizing property and low power consumption grows active. An example of combining a display apparatus using an electroplating with a color filter is disclosed in Japanese Patent Application Laid-Open No. H11-101994. Japanese Patent Application Laid-Open No. H11-101994 discusses a structure in which a silver salt solution is arranged between a working electrode and a counter electrode, a color filter is disposed on an incident light side of the working electrode (a side of the working electrode opposite to a side on which the silver salt solution is arranged), and a white background plate is disposed over the counter electrode (a side of the counter electrode on which the silver salt solution is arranged). If silver is deposited on the working electrode, the deposited silver absorbs incident light through the color filter. On the other hand, if silver is not deposited on the working electrode, the incident light through the color filter transmits the working electrode, is reflected by the white background plate and transmits the working electrode and the color filter, so that a color display is performed.

Japanese Patent Application Laid-Open No. H11-101994 discusses a structure in which incident light passes through the color filter before being reflected by a reflecting layer. In order to display white with this structure, pixels for three primary colors are required. Each pixel only reflects one color and color components not being reflected in incident light are absorbed at a color filter of each pixel. For example, blue and green components are absorbed at a pixel reflecting red, red and green components are absorbed at a pixel reflecting blue, and blue and red components are absorbed at a pixel reflecting green. Accordingly, the red component is absorbed at the blue and green pixels, the blue component is absorbed at the red and green pixels, and the green component is absorbed at the red and blue pixels during a white display. That is, an area reflecting red is one-third of a display apparatus area. This is the same as green and blue. Because of reflection only at one-third area of the respective colors, a whole reflection ratio during the white display is one-third even if considering only an effective reflection area ratio of the respective colors. Thus, improvement of reflection ratios is desired.

SUMMARY OF THE INVENTION

The present invention has an object to provide a reflection type display apparatus having a high reflection ratio during a white display and capable of a color display.

A reflection type display apparatus of the present invention includes: a light modulating layer having a first electrode having a light transmitting property on which an electroplating can be deposited, a second electrode disposed, in opposition to the first electrode, on a reflecting plate for reflecting light of a certain wavelength band, and an electrolytic solution containing a metal ion arranged in contact with the first and second electrodes, wherein, according to a density of current at an interface between the first electrode and the electrolytic solution, the light modulating layer controls a light transmitting ratio and a reflection ratio of the electroplating; and a control unit for setting a direction and the density of the current, wherein the control unit sets the density of the current at a first current density equal to a threshold current density or smaller than and approximately equal to the threshold current density at the time of depositing the electroplating of a first color, sets the density of the current at a second current density smaller than the first current density at the time of depositing the electroplating of a second color different from the first color, and sets the current to flow in a direction opposite to a direction of the current for forming the electroplating so that the electroplating disappears.

A driving method of a reflection type display apparatus of the present invention includes: a light modulating layer having a first electrode having a light transmitting property on which an electroplating can be deposited, a second electrode disposed, in opposition to the first electrode, on a reflecting plate for reflecting light of a certain wavelength band, and an electrolytic solution containing a metal ion arranged in contact with the first and second electrodes, wherein, according to a density of current at an interface between the first electrode and the electrolytic solution, the light modulating layer controls a light transmitting ratio and a reflection ratio of the electroplating, wherein the method sets the density of the current at a first current density equal to a threshold current density or smaller than and approximately equal to the threshold current density, to deposit the electroplating of a first color, for displaying of the first color of the electroplating; sets the density of the current at a second current density smaller than the first current density, to deposit the electroplating of a second color different from the first color, for displaying of the second color of the electroplating; and sets the current to flow in a direction opposite to a direction of the current for forming the electroplating so that the electroplating disappears, for displaying of a color of the reflecting plate.

The reflection type display apparatus of the present invention enables the light modulating layer to be in three states of light reflecting, light absorbing and light transmitting, and in a state in-between the three states. Moreover, it is possible to control a reflecting state of incident light as described below by laminating the light modulating layer on the reflecting plate for reflecting a certain wavelength band.

When an electroplating is deposited with a predetermined current density and the light modulating layer is in the light reflecting state, reflection with a high reflection ratio is possible because incident light is reflected intact. The display apparatus is in a white display state under the condition of the incident light being reflected intact. In the white display state, a white display with a higher reflection ratio compared with conventional technique can be obtained because the incident light is reflected over all wavelength bands without being absorbed by a color filter and the like. Additionally, when the electroplating disappears and the light modulating layer is in the light transmitting state, only a certain wavelength band is reflected by the reflecting plate and a color depending on the reflecting plate is displayed. When the electroplating is deposited with a current density different from the predetermined current density and the light modulating layer is in the light absorbing state, the incident light is not reflected and black is displayed. Thus, combining above states enables a white display with a high reflection ratio and realizing the display apparatus capable of a color display. Here, the cases of a white display and a black display are described, while a color display can be determined by a color of the electroplating.

Further features of the present invention will become apparent from the following description of exemplary embodiments (with reference to the attached drawings).

BRIEF DESCRIPTION OF THE DRAWINGS

FIGS. 9A, 9B, 9C and 9D show drawings illustrating examples of shapes of counter electrodes.

DESCRIPTION OF THE EMBODIMENTS

Figure 1:
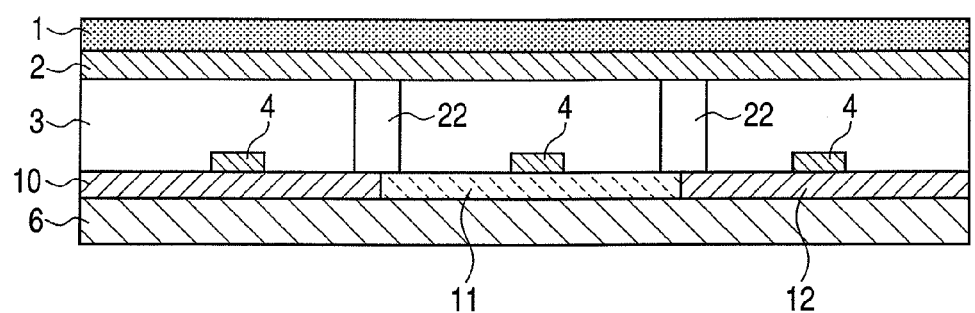
FIG. 1 is a sectional view of a reflection type display apparatus of an exemplary embodiment according to the present invention.
Figure 8:
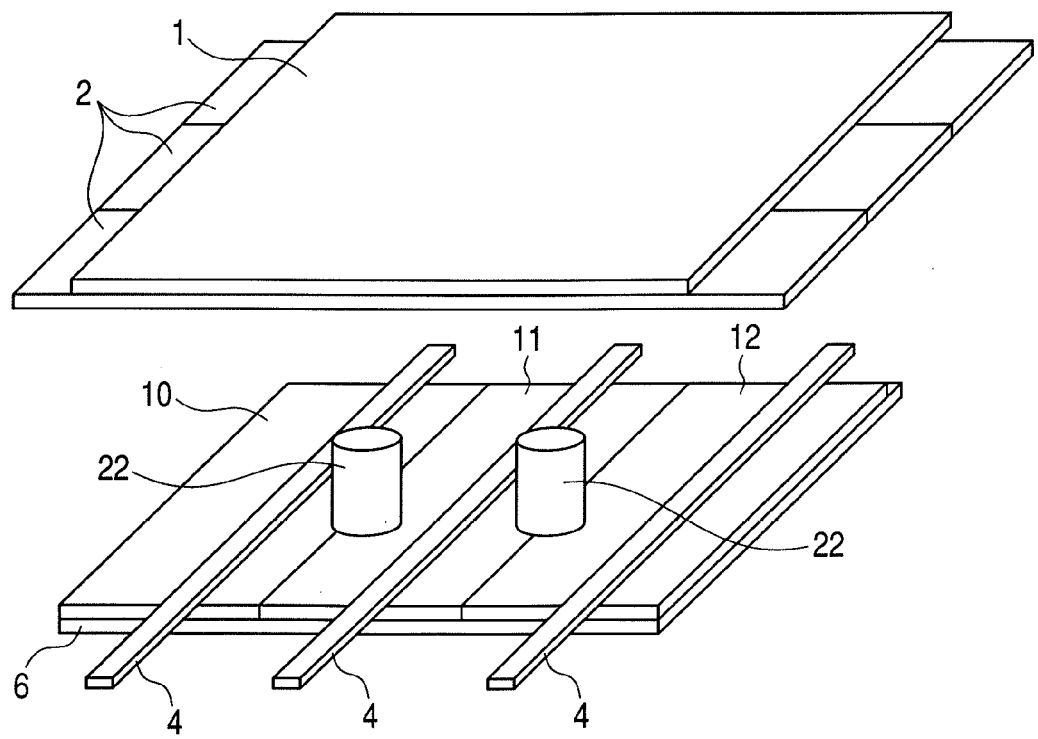
FIG. 8 is a perspective view of the reflection type display apparatus shown in FIG. 1.

FIG. 1 is a sectional view of a reflection type display apparatus of an exemplary embodiment according to the present invention. FIG. 8 is a perspective view of a reflection type display apparatus for a passive matrix driving. The reflection type display apparatus of the embodiment may employ one of a passive matrix driving and an active matrix driving. FIG. 1 illustrates a common configuration of a passive matrix driving and an active matrix driving.

A structure of the reflection type display apparatus is described with FIG. 1. The reflection type display apparatus of the embodiment is a display apparatus using an electroplating. The apparatus includes a transparent supporting substrate 1 for protecting a surface, a light transmitting electrode 2, counter electrodes 4 in opposition to the light transmitting electrode 2 with an electrolytic solution 3 in between, reflecting plates 10 to 12 for reflecting respective wavelength bands of red, green and blue, and a supporting substrate 6. The supporting substrate 1 is a second substrate, the light transmitting electrode 2 is a first electrode, the counter electrodes 4 are second electrodes, and the supporting substrate 6 is a first substrate. The electrolytic solution 3 contains a metal ion. The counter electrodes 4 are transparent or have a structure in which an area of the counter electrode 4 in a pixel is small and visually recognizing of the reflecting plates from the surface is not easily prevented. Spacers 22 maintain a space between the supporting substrates constant. The spacers 22 are formed in any shapes including a column, a sphere and a square pole. A light modulating layer includes the light transmitting electrode 2, the electrolytic solution 3 and the counter electrodes 4. The light transmitting electrode 2 is a light transmitting conductive layer such as ITO. It is desirable that the supporting substrate 1 and the light transmitting electrode 2 are transparent, while they may be translucent as long as having light transmitting properties.

In FIG. 8, the counter electrodes 4 have a narrow line shape and are arranged along a plurality of lines in one direction (a direction X) over the supporting substrate 6. The light transmitting electrodes 2 are arranged along a plurality of lines on the supporting substrate 1 in a direction perpendicular to the X direction (a direction Y) so as to cross the counter electrodes 4 arranged along the plurality of lines. The reflecting plates 10 to 12 are provided in a pixel size.

Figure 4:
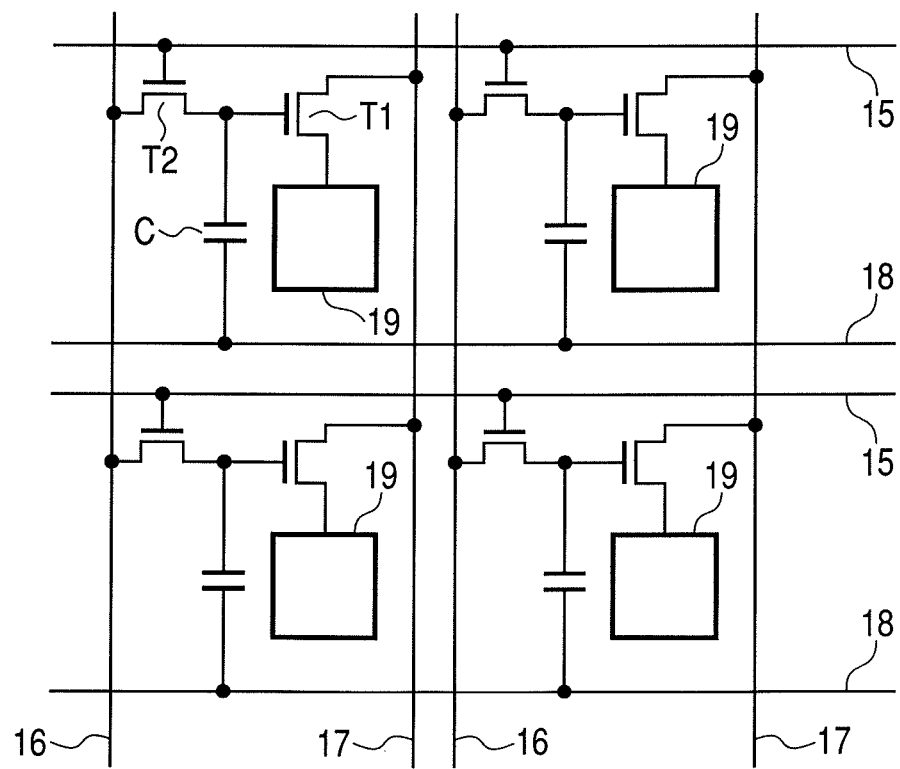
FIG. 4 is a circuit diagram of a reflection type display apparatus of a second embodiment according to the present invention.

In the case of a reflection type display apparatus with an active matrix driving, as shown in FIG. 4, electrodes 19, which are ones of the light transmitting electrodes 2 and the counter electrodes 4, are arranged one pixel by one pixel. Each electrode 19 is connected to each first switch T1 such as a thin film transistor. The other electrodes of the light transmitting electrodes 2 and the counter electrodes 4 are common electrodes. A second switch T2 such as a thin film transistor controls conduction of the first switch T1. The second switch T2 is connected to a control terminal of the first switch T1 (a gate if the switch is a field effect transistor). Then, a control terminal of the second switch T2 (a gate if the switch is a filed effect transistor) is connected to a scanning line 15 (a gate line if the switch is a field effect transistor). A data signal from a data line 16 is applied to the control terminal of the first switch T1 and a capacitor C by an on/off control of the second switch T2. Then the data signal is stored in the capacitor C. The first and second switches are disposed one pixel by one pixel. A current of set current density flows through the first switch T1 by an on/off control of the first switch T1. There are also provided ground (GND) lines 18.

The counter electrode 4 does not necessarily have a narrow line shape shown in FIG. 8 and various shapes can be employed. A potential distribution between the counter electrode 4 and the light transmitting electrode 2 changes according to the shape of the counter electrode 4. In the case of making the potential distribution between the counter electrode 4 and the light transmitting electrode 2 more uniform, stripe shaped, mesh shaped, and comb shaped counter electrodes shown in FIGS. 9B, 9C and 9D can be employed. FIG. 9A illustrates narrow line shaped counter electrodes as shown in FIG. 8. In FIGS. 9A to 9D, a reflecting plate 26 is red, a reflecting plate 27 is blue and two reflecting plates 28 are green in the case of a Bayer array. There are also provided counter electrodes 29. Here, the shapes of the counter electrodes of the reflection type display apparatus are illustrated for a passive matrix driving, while the counter electrodes are separated one pixel by one pixel with a light transmitting electrode being a common electrode for an active matrix driving. The separated counter electrodes are connected to the first switches T1 in FIG. 4.

A voltage which makes cathode as the light transmitting electrode 2 and anode as the counter electrode 4 is applied between the light transmitting electrode 2 and the counter electrode 4 to cause a current flow. Because of this, a metal ion contained in the electrolytic solution 3 is reduced and deposited on the surface of the light transmitting electrode 2 to be deposited as electroplating on the surface of the light transmitting electrode 2. This electroplating is oxidized to dissolve in the electrolytic solution 3 when a direction of the current is reversed.

It is possible to control a film color of the electroplating by a density of current flowing through an interface between the electrolytic solution 3 and the light transmitting electrode 2 on which the electroplating is deposited (a surface of the light transmitting electrode 2 in contact with the electrolytic solution 3). For example, if the light transmitting electrode 2 is made of ITO and zinc is electroplated on an ITO surface, electroplating with a low current density on the order of 30 mA/cm$^2$ deposits a white film. On the other hand, electroplating with a high current density of 100 mA/cm$^2$ deposits a black film. Black is a first color and white is a second color. This phenomenon is described below by using a concept of a threshold current density. Concerning an electric double layer on the surface of the light transmitting electrode 2 in contact with the electrolytic solution 3, a metal ion concentration in the electric double layer is defined by a balance between consumption by electrodeposition and supply by diffusing from the inside of the solution. An ion consumption speed is proportionate to the current density. Since the supply by diffusing is superior to the ion consumption at a sufficiently low current density (a second current density), plenty of ions exist close to the electrode surface to electrodeposit a site minimizing surface energy of the electroplating on a priority basis. As a result, the deposited electroplating is smoothed and a white metal has a white color. However, the ion consumption speed is equal to an ion supply speed at a certain current density. This current density is mentioned as a threshold current density. At the threshold current density, the ion concentration in the electric double layer is approximately zero and the electric double layer is always under the condition of ion deficiency, and therefore, the ions supplied by diffusing immediately perform electrodeposition without selecting a deposition site. As a result, the deposited electroplating is rough and becomes black. Thus, a phenomenon of becoming black occurs even at a current density approximately equal to the threshold current density.

The threshold current density can be determined by colors. As a current density is raised gradually to be close to the threshold current density, the electroplating becomes rough to be black. The current density at which the color becomes black can be considered one of the threshold current density and a current density approximately equal to the threshold current density. In this manner, color change of the threshold current density can be apparently determined visually, while measuring a reflection ratio enables quantification. As a current density is further raised over the current density at which a film becomes back, electroplating does not occur and powder is generated in the solution. Accordingly, if the electroplating is black, it is desirable to set a current density at a value equal to the threshold current density or smaller than and approximately equal to the threshold current density. The value equal to the threshold current density or smaller than and approximately equal to the threshold current density is a first current density.

As described above, changing a current density can form white and black electroplatings, thereby being able to display white and black. Then, a light transmitting state can be created by not forming an electroplating or dissolving the formed electroplating. If halftoning of a certain color is performed, quantity of charge energized between the light transmitting electrode 2 and the counter electrode 4 is controlled and a thickness of the electroplating is adjusted. Adjusting the thickness of the electroplating controls quantity of light transmitting the electroplating, being reflected by the reflecting plate and transmitting the electroplating after that, so that a halftoning control is realized. Note that the quantity of charge energized is time quadrature of a current flowing in the same direction between the light transmitting electrode 2 and the counter electrode 4.

Figure 10:
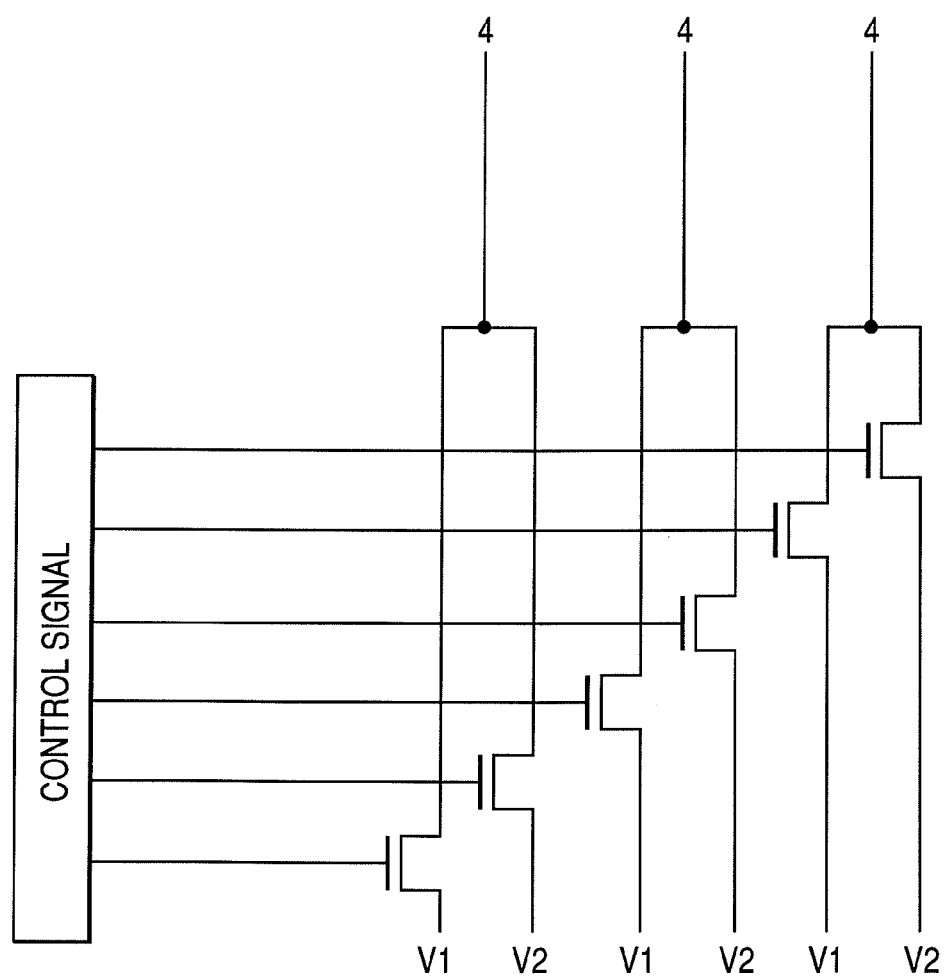
FIG. 10 is a circuit diagram illustrating a control circuit for controlling a current density.
Figure 11:
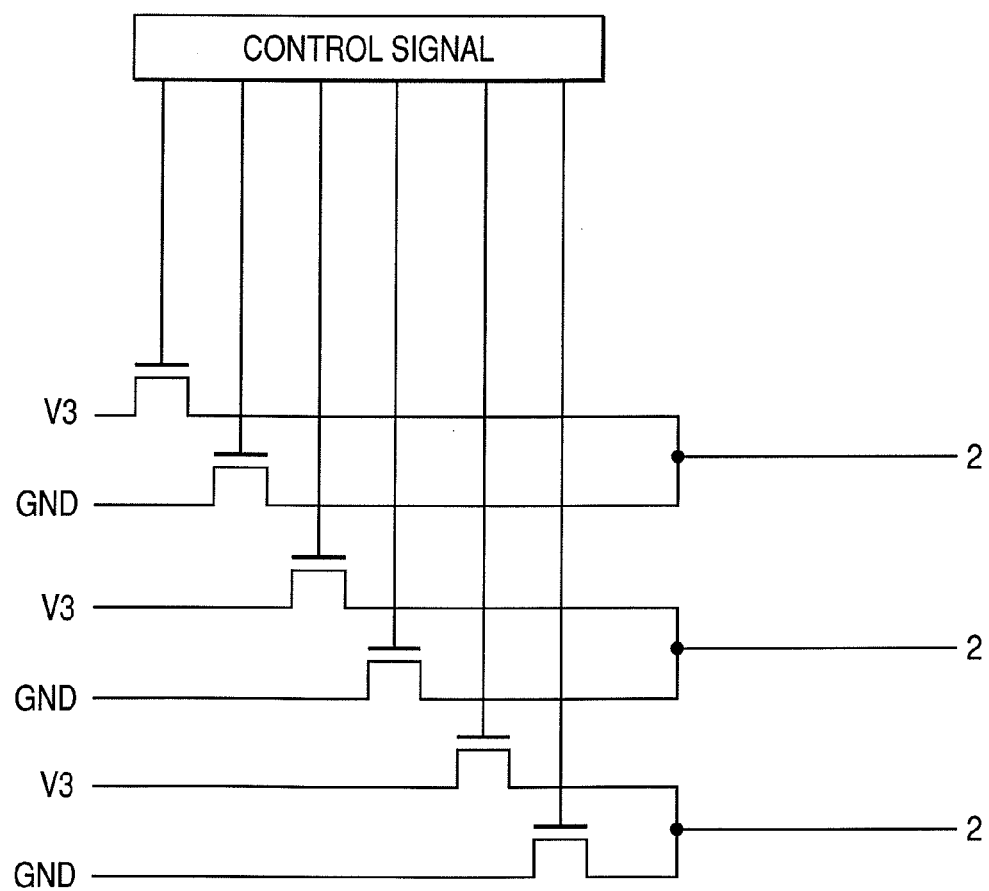
FIG. 11 is a circuit diagram illustrating a control circuit for controlling a current density.

In order to change a current density, at least two voltages may be switched to be applied to the counter electrode 4 and the light transmitting electrode 2 by using control circuits (control units) for controlling a current density shown in FIGS. 10 and 11. That is, a control signal from the first control circuit controls two transistors so that voltages V1 and V2 (V2>V1) can be applied to the counter electrode 4. The voltage V2 is a voltage value setting the current density at a value equal to the threshold current density or approximately equal to the threshold current density. The voltage V1, which is lower than the voltage V2, is a voltage value setting the current density at which the electroplating becomes white.

Then, a control signal from the second control circuit controls the two transistors so that GND and a voltage V3 (>V1, V2) can be applied to the light transmitting electrode 2. The voltage V3, which is set to be higher than the voltages V1 and V2, is a voltage value setting the electroplating to be thin or disappear with a direction of the current opposite.

When displaying black, the voltage V2 is applied to the counter electrode 4 and the light transmitting electrode 2 is GND. When displaying white, the voltage V1 is applied to the counter electrode 4 and the light transmitting electrode 2 is GND. In the case of a transmitting state (a color display), one of the voltages V1 and V2 is applied to the counter electrode 4 and the light transmitting electrode 2 is the voltage V3. When performing halftoning between white and black, time is controlled in which one of the voltages V1 and V2 is applied to the counter electrode 4, or in which one of the voltages V1 and V2 is applied to the counter electrode 4 and the light transmitting electrode 2 is V3. Because of this, the quantity of charge energized is controlled, and the thickness of the electroplating is deposited by a certain thickness or disappears up to a certain thickness, so that the halftoning can be performed. In order to perform halftoning of a color display, a thickness of the electroplating on the reflecting plate 10 of a specific color (for example, red) may be controlled. One of the voltages V1 and V2 is applied to the counter electrode 4 and the light transmitting electrode 2 is the voltage V3. In such a case, the counter electrode 4 may be electroplated in white or black, however, it is possible not to influence on a display by reducing the area of the counter electrode.

In the above description, the current density is set in a binary value for changing a color of the electroplating, while the present invention can be applied to a case where the current density is set in a binary value, a ternary value or more multiple value for changing a color of the electroplating and is not limited to the binary value.

As described above, the light modulating layer includes the light transmitting layer 2, the electrolytic solution 3 and the counter electrode 4 so that an absorbing ratio of the light modulating layer can be controlled by controlling the quantity of charge energized between the light transmitting electrode 2 and the counter electrode 4 and adjusting the thickness of the electroplating.

Figure 2:
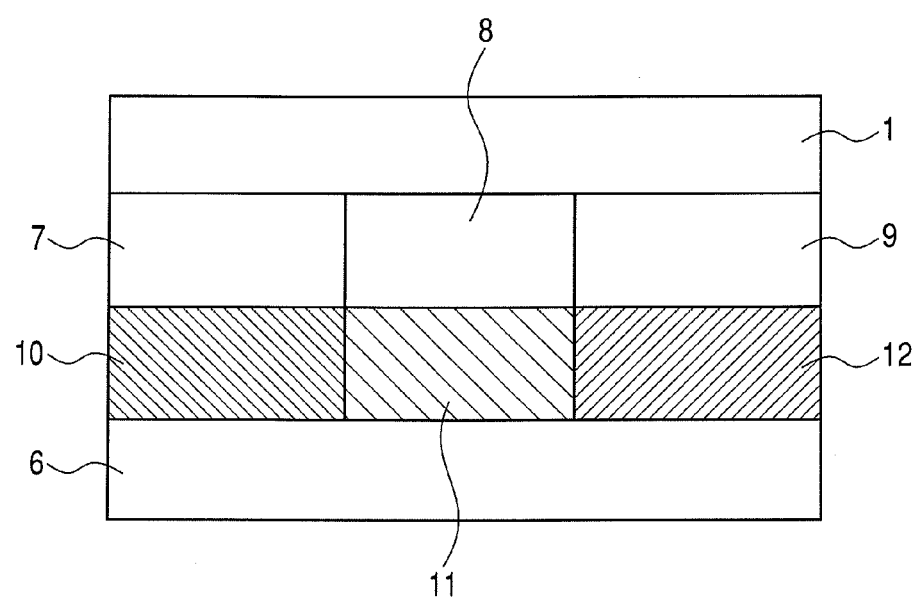
FIG. 2 is a schematic sectional view for a full-color display with the reflection type display apparatus according to the present invention.

FIG. 2 is a schematic sectional view for a full-color display with the reflection type display apparatus according to the present invention. In FIG. 2, the light transmitting electrode 2, the electrolytic solution 3 and the counter electrode 4 over the reflecting plates 10, 11 and 12 are respectively shown as light modulating layers 7, 8 and 9. The reflecting plates 10, 11 and 12 respectively reflect wavelength bands of red, green and blue. The light modulating layers 7, 8 and 9 are controlled within a range of 0 to 100% of a light absorbing ratio and 0 to 100% of a light reflection ratio by controlling the current density and the quantity of charge energized.

Assume that a transmitting ratio, a reflection ratio and an absorbing ratio of the light modulating layer is respectively T, R and A, formulas 1 and 2 below are derived.

$$T=1-A-R \quad \text{(formula 1)}$$

Figure 3:
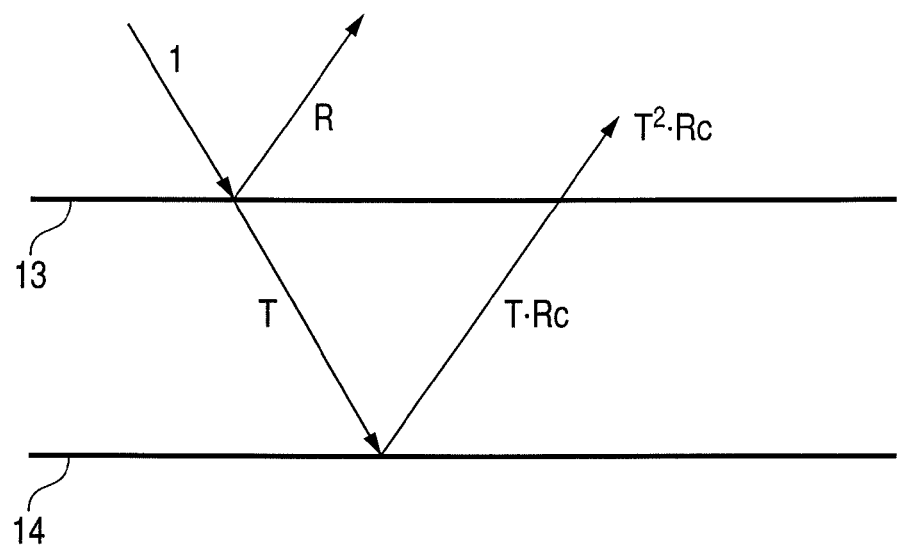
FIG. 3 is a schematic diagram illustrating principles of a display of the reflection type display apparatus according to the present invention.

Assume that an incident light intensity is 1 and a reflection ratio at the reflecting plate is Rc, a multiple reflection is ignored and a reflected light intensity I follows formula 2 (see FIG. 3). In FIG. 3, a reflecting surface 13 of the light modulating layer, that is, a surface of an electroplating film and a reflecting plate surface 14 are illustrated.

$$I=R+T^2/RC \quad \text{(formula 2)}$$

The reflection type display apparatus of the embodiment enables a color display, a black display and a white display with a high reflection ratio, as sequentially described below.

In the case of displaying a specific color, for example, red, the light modulating layer 7 on the reflecting plate 10 for reflecting a red wavelength band is made to be in a transmitting state (A=0, R=0), that is, a state of T=1. The light modulating layers 8 and 9 on the reflecting plate 11 and 12 for respectively reflecting green and blue wavelength bands are made to be in an absorbing state. These are shown in table 1.

TABLE 1

STATES OF LIGHT MODULATING LAYERS DURING RED DISPLAY

| Absorbing ratio A | 0 | 1 | 1 |
|---|---|---|---|
| Reflection ratio R | 0 | 0 | 0 |
| Reflected light intensity I | Rc | 0 | 0 |
| Reflecting plates | Red (Reflecting plate 10) | Green (Reflecting plate 11) | Blue (Reflecting plate 12) |

The incident light transmits the light modulating layer 7 on the reflecting plate 10 for reflecting the red wavelength band and red is reflected at the reflecting plate 10. The light modulating layer 8 and 9 do not reflect and transmit (R=0) but absorb the incident light (A=1) so that black is displayed. As a result, only red is reflected and red is displayed.

Similarly, states of the light modulating layers during a white display are shown in table 2. All incidents light are reflected at the light modulating layers during a white display so that white is displayed. According to the embodiment, the incident light is not absorbed by a color filter and the like during a white display and all the incident light is reflected (R=1), and therefore, a high reflection ratio can be realized. Similarly, states during a black display are shown in table 3.

TABLE 2

STATES OF LIGHT MODULATING LAYERS DURING WHITE DISPLAY

| Absorbing ratio A | 0 | 0 | 0 |
|---|---|---|---|
| Reflection ratio R | 1 | 1 | 1 |
| Reflected light intensity I | 1 | 1 | 1 |
| Reflecting plates | Red (Reflecting plate 10) | Green (Reflecting plate 11) | Blue (Reflecting plate 12) |

TABLE 3

STATES OF LIGHT MODULATING LAYERS DURING BLACK DISPLAY

| Absorbing ratio A | 1 | 1 | 1 |
|---|---|---|---|
| Reflection ratio R | — | — | — |
| Reflected light intensity I | 0 | 0 | 0 |
| Reflecting plates | Red (Reflecting plate 10) | Green (Reflecting plate 11) | Blue (Reflecting plate 12) |

Similarly, halftoning from white to black is possible. If a transmitting ratio of the light modulating layers is n (0<n<1), it is possible to display white with a reflection ratio of $n^2 \times Rc$, that is, gray by adjustment as shown in table 4.

TABLE 4

STATES OF LIGHT MODULATING LAYERS DURING WHITE-BLACK DISPLAY WITH REFLECTION RATIO OF $n^2 \times 0.33$

| Absorbing ratio A | 1 − n | 1 − n | 1 − n |
|---|---|---|---|
| Reflection ratio R | 0 | 0 | 0 |
| Reflected light intensity I | $n^2 \times Rc$ | $n^2 \times Rc$ | $n^2 \times Rc$ |
| Reflecting plates | Red (Reflecting plate 10) | Green (Reflecting plate 11) | Blue (Reflecting plate 12) |

Halftoning of a specific color is also possible. For example, if red with a reflection ratio of $n^2 \times Rc$ is displayed, adjustment as shown in table 5 is performed.

TABLE 5

STATES OF LIGHT MODULATING LAYERS DURING RED DISPLAY WITH REFLECTION RATIO OF $n^2 \times 0.33$

| Absorbing ratio A | 1 − n | 1 | 1 |
|---|---|---|---|
| Reflection ratio R | 0 | 0 | 0 |
| Reflected light intensity I | $n^2 \times Rc$ | 0 | 0 |
| Reflecting plates | Red (Reflecting plate 10) | Green (Reflecting plate 11) | Blue (Reflecting plate 12) |

The above combinations enable a color display and realizing a display with a high reflection ratio during a white display. The combinations above are only examples and are not necessarily limited thereto but various combinations may be employed.

A pixel size of the reflection type display apparatus of the embodiment is not limited but appropriately set depending on applications, while the pixel size can be set at, for example, from the order of 10 μm to several 10 mm.

In the embodiment, there is not provided a barrier separating pixels, while the barrier may be provided as required. However, if a voltage applied between the pixels is at a certain "critical voltage" or less, electroplating does not occur and the adjacent pixels do not influence each other. For example, Japanese Patent Application Laid-Open No. 2004-170850 discusses about this.

Embodiment 1

In this embodiment, a specific structure of a reflection type display apparatus is described with FIGS. 1 and 8. Glass with a thickness 0.7 mm is used for the supporting substrate 1 and ITO with a thickness 150 nm deposited by a sputtering method is used for the light transmitting electrodes 2. An aqueous solution including zinc ions of 18 g/L is used for the electrolytic solution 3. A pixel size is 0.7 mm×0.7 mm and a thickness of the electrolytic layer 3 is 0.1 mm. Mesh shaped platinum wires with a width 0.1 mm and a thickness 3 μm as shown in FIG. 9C are used for the counter electrodes 4. As a reflecting plate 5 in FIG. 1, a not-shown glass plate with a thickness 0.1 mm and not-shown colored paper are laminated in this order for using. A silicon wafer is used for the supporting substrate 6.

A 4V voltage with the light transmitting electrode 2 being cathode is applied between the light transmitting electrode 2 and the counter electrode 4 so that a current of 30 mA/cm$^2$ flows to form a white zinc electroplating on the surface of the light transmitting electrode 2. The electroplating becomes thicker in proportion to current-carrying time and a reflection ratio increases. A sufficient reflecting property for a practical use can be obtained in 10 seconds. Quantity of charge energized in this case is 0.3 coulombs per square centimeter. Assume that efficiency is 100%, 0.3 F (mol/cm$^2$) of zinc is deposited, where F is a Faraday constant. In general, as quantity of charge energized increases, quantity of electroplating to be deposited, a reflection ratio and an absorbing ratio increase, and a transmitting ratio decreases.

A 7V voltage with the light transmitting electrode 2 being cathode is applied between the light transmitting electrode 2 and the counter electrode 4 so that a current of 100 mA/cm$^2$ flows to form a black zinc electroplating on the surface of the light transmitting electrode 2. The electroplating becomes thicker in proportion to current-carrying time and an absorbing ratio increases. A sufficient light blocking property can be obtained in 3 seconds. If a direction of the current is reversed, the electroplating dissolves in the electrolytic solution again.

In Embodiment 1, transparent solids such as resin other than glass can be used for the transparent supporting substrate 1 for protecting the surface and a middle supporting substrate of the reflecting plate 5. Conductive transparent materials such as IZO (Indium-Zinc-Oxide), zinc oxide and titanium oxide other than ITO can be used for the light transmitting electrodes 2. Also, a metal thin film, a metal mesh structure and a metal comb structure can be used if they are substantially transparent.

A commercial zinc plating solution, for example, can be used for the electrolytic solution 3, while not limited thereto. For example, if solution including 30 g/L of silver, 500 g/L of potassium iodide, 5 g/L of methanesulfonic acid and water is used for the electrolytic solution 3, a black electroplating is deposited with 100 mA/cm$^2$ and a white electroplating is deposited with 40 mA/cm$^2$. Carbon, gold, etc. other than platinum can be used for the counter electrodes 4 as long as a conductor is the same kind as the deposited electroplating or is a stable conductor which does not change by reaction with the electroplating. Also, transparent materials such as ITO can be used. The reflecting plate 5 is a material selectively reflecting a specific color. The reflecting plate 5 may also employ a laminated structure in which a reflecting plate is disposed under a color filter for transmitting a specific color or a colored single-layer reflector other than the above structure. The supporting substrate 6 is not limited to a silicon wafer and various solids having appropriate strength can be used. Moreover, the supporting substrate 6 can be omitted if the reflecting plate 5 has sufficient strength.

Embodiment 2

In this embodiment, the reflecting plate of the reflection type display apparatus in Embodiment 1 is made to have three colors of red, green and blue and arranged with a Bayer array in a matrix so that a reflection type display apparatus capable of a color display is formed. An active matrix driving with transistors is employed for driving pixels. An exemplary circuit is shown in FIG. 4. A gate line 15 opens (On) a transistor 20 and storing a voltage of a data line 16 in a capacitor 22 opens a transistor 21. Thus, a voltage of a common line 17 is applied to a counter electrode 19 of a pixel. The electrode 19 is the counter electrode 4 in FIG. 1 and an electroplating is deposited by a potential difference between the electrodes 2 and 19. For example, if a voltage of the common line 17 is 4V and a voltage of the electrode 2 is 0V with the configuration in Embodiment 1, a white zinc electroplating is deposited on the electrode 2. After a certain holding time not over 10 seconds, the capacitor 22 is discharged by opening the transistor 20 with a potential of the data line 16 being 0V so that the transistor 21 is turned off. The above process is repeatedly performed and the number of repeating controls a thickness of the white electroplating deposited on the electrode 2. Also, after a holding time not over 3 seconds, the similar driving is performed with a potential of the common line 17 being 7V so that a thickness of a black electroplating can be controlled.

A color array of the reflecting plates is not limited to the Bayer array. Also, the coloration is not limited above and a combination of cyan, magenta and yellow may be employed. Additionally, a passive matrix driving with a crossed electrode may be employed for driving.

Embodiment 3

Figure 5:
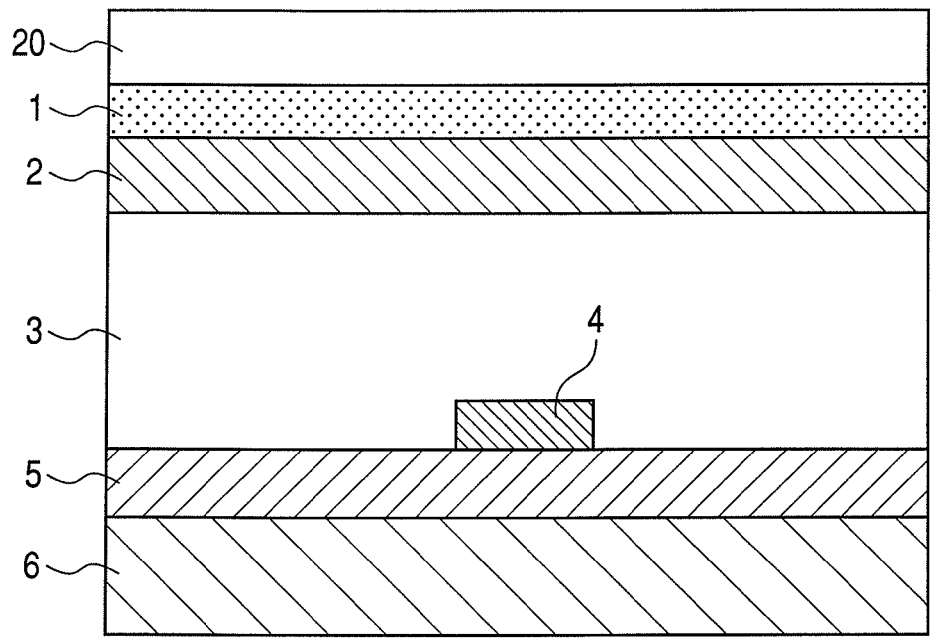
FIG. 5 is a sectional view illustrating a reflection type display apparatus of a third embodiment according to the present invention.

This embodiment is described with FIG. 5, which is a schematic view illustrating a cross section structure of the embodiment. In a third embodiment of the present invention, a scattering sheet 20 (a layer for scattering light) is stuck on a surface of the supporting substrate 1 in the cross section structure of FIG. 1. All the other components are the same as FIG. 1. With this configuration, a texture of a white display is close to a paper texture owing to an effect of the scattering sheet. This configuration is superior for not a mirror surface texture but a paper texture. There is also provided a reflecting plate 5.

A position on which the scattering sheet is disposed is not limited to the top surface but anywhere as long as the scattering sheet is closer to the surface than the electroplating. As an apparatus structure, a layer having a scattering function may be disposed closer to the surface than the interface between the light transmitting electrode 2 and the electrolytic solution 3 (a layer may be disposed at a side opposite to a side of the light modulating layer, on which the reflecting plate is disposed). Also a material is not limited to a scattering sheet and the other components may have the scattering function. For example, the supporting substrate 1 and the light transmitting electrode 2 may have the light scattering function.

Embodiment 4

Figure 6:
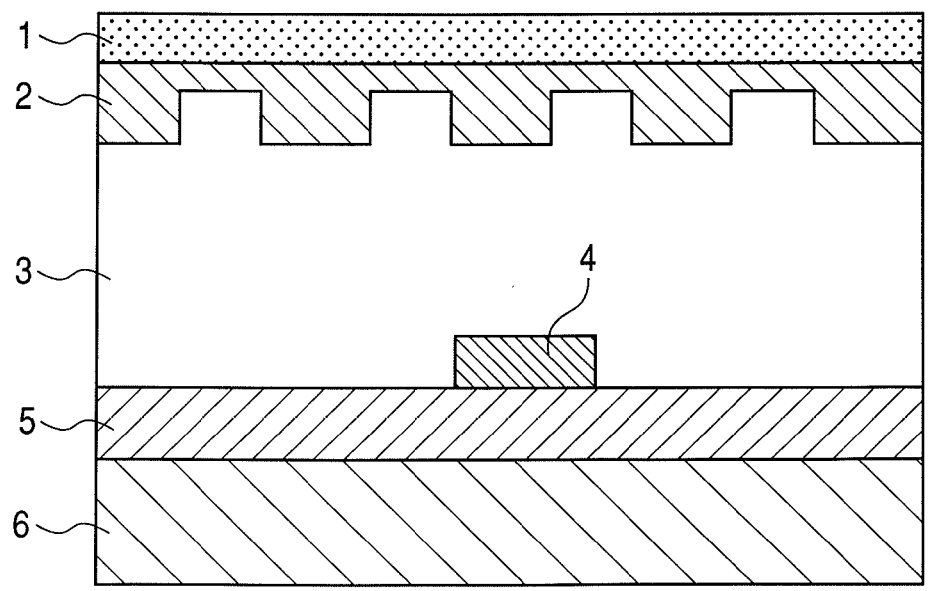
FIG. 6 is a sectional view illustrating a reflection type display apparatus of a fourth embodiment according to the present invention.

This embodiment is described with FIG. 6, which is a schematic view illustrating a cross section structure of a reflection type display apparatus in the embodiment. In order to obtain the same effect as Embodiment 3, 0.05 mm pitch pattern with a concave and convex shape is formed on the interface between the light transmitting electrode 2 and the electrolytic solution 3 in FIG. 1 by a photo processing and a wet etching. The other components are the same as FIG. 1. When an electroplating that reflects light is deposited on the light transmitting electrode 2 having the concave and convex shape, a high quality white display close to paper is possible because the light is scattered at the concave and convex shape. It should be noted that a pattern with the concave and convex shape may have a function scattering light and a pitch size, an arrangement, an electrode material, etc. are not limited above.

Embodiment 5

Figure 7:
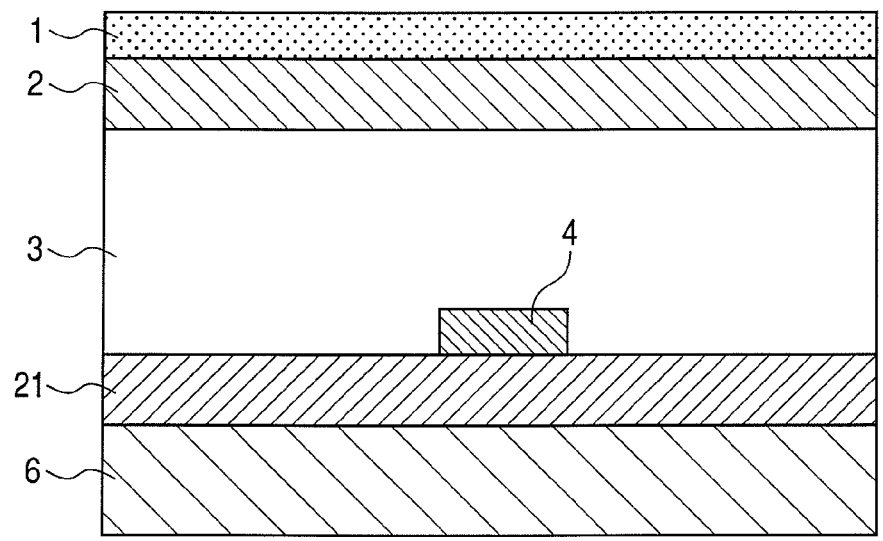
FIG. 7 is a sectional view illustrating a reflection type display apparatus of a fifth embodiment according to the present invention.

This embodiment is described with FIG. 7, which is a schematic view illustrating a cross section structure of a reflection type display apparatus in the embodiment. A multilayer dielectric film 21 for reflecting a certain wavelength band is used as the reflecting plate 5 in Embodiment 1. A film having a thickness of $n \cdot d = m \cdot \lambda/2$ (n is a refractive index, d is a film thickness and m is an integer) and a different refractive index is laminated to a wavelength $\lambda$ to be reflected. Because of this, a suitable selective reflection is possible.

As an example, in order to reflect blue with a 450 nm wavelength, silica with a 308 nm thickness (a refractive index of 1.46) and titania with a 180 nm thickness (a refractive index of 2.5) are alternately laminated by three layers. Thus, a suitable reflection can be performed.

Green with a 550 nm wavelength can also be reflected by laminating silica with a 377 nm thickness and titania with a 220 nm thickness by three layers.

Red with a 700 nm wavelength can also be reflected by laminating silica with a 479 nm thickness and titania with a 280 nm thickness by three layers.

Photolithography and etching can be used for a desired pixel to have a desired reflecting property. It should also be noted that materials and thickness of the multilayer dielectric film are not limited above but can be selected according to a necessary band.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-187105, filed Jul. 18, 2007, which is hereby incorporated by reference herein in its entirety.

What is claimed is:

1. A reflection type display apparatus comprising:
a light modulating layer having a first electrode having a light transmitting property on which an electroplating can be deposited, a second electrode disposed, in opposition to the first electrode, on a reflecting plate for reflecting light of a certain wavelength band, and an electrolytic solution containing a metal ion arranged in contact with the first and second electrodes, wherein the metal ion is silver ion or zinc ion, according to a density of current at an interface between the first electrode and the electrolytic solution, the light modulating layer controls a light transmitting ratio and a reflection ratio; and
a control unit for setting a direction and the density of the current, wherein
the control unit sets the density of the current at a first current density equal to a threshold current density or smaller than and approximately equal to the threshold current density at the time of depositing the electroplating of a black color, sets the density of the current at a second current density smaller than the first current density at the time of depositing the electroplating of a white color, and sets the current to flow in a direction opposite to a direction of the current for forming the electroplating so that the electroplating disappears, and the electroplating of the white color is smooth and the electroplating of the black color is rough; wherein the reflecting plate is a multilayered dielectric film.

2. The reflection type display apparatus to claim 1, wherein the light modulating layer controls the light transmitting ratio and the reflection ratio according to a quantity of charge energized by a current flowing in the same direction, the control unit sets the quantity of the charge energized in a binary value, a ternary value or more multiple value.

3. The reflection type display apparatus to claim 1, further comprising
a first substrate on which the reflecting plate and the second electrode are arranged, and a second substrate of a light transmitting property, on which the first electrode is arranged, disposed in opposition to the first substrate, and wherein
the reflecting plate includes a reflecting plate reflecting a blue color, a reflecting plate reflecting a red color, and a reflecting plate reflecting a green color,
the second electrode includes at least three electrodes, each of which is arranged on a corresponding one of the reflecting plates and the first substrate, and
the reflecting plates are arranged adjacently to each other on the first substrate.

4. The reflection type display apparatus to claim 1, comprising a plurality of pixels, each comprising:
a first switch connected to one of the first and second electrodes, wherein the one of the first and second electrodes is arranged in a matrix, and the current of which direction is set by the control unit flows through the first switch; and
a second switch connected to a control terminal of the first switch for controlling turning on and off of the first switch.

5. The reflection type display apparatus to claim 3, further comprising
a light scattering layer disposed at a side of the light modulating layer opposite to a side on which the reflecting plate is disposed.

6. The reflection type display apparatus to claim 1, wherein a plurality of second electrodes are arranged along a plurality of lines in one direction, and a plurality of first electrodes are arranged along a plurality of lines in a direction perpendicular to the one direction so as to cross the second electrodes arranged along the plurality of lines.

7. The reflection type display apparatus to claim 1, wherein the first electrode has a concave and convex shape for scattering the light.

8. The reflection type display apparatus according to claim 1, wherein
the control unit sets a voltage between the first electrode and second electrode at a first voltage for setting the first current density, sets the voltage at a second voltage different from the first voltage for setting the second current density, and sets the voltage at a third voltage different from the first voltage and the second voltage for setting the current to flow in a direction opposite to a direction of the current for forming the electroplating so that the electroplating disappears.

9. A driving method of a reflection type display apparatus comprising a light modulating layer having a first electrode having a light transmitting property on which an electroplating can be deposited, a second electrode disposed, in opposition to the first electrode, on a reflecting plate for reflecting light of a certain wavelength band, and an electrolytic solution containing a metal ion arranged in contact with the first and second electrodes, wherein the metal ion is silver ion or zinc ion, according to a density of current at an interface between the first electrode and the electrolytic solution, the light modulating layer controls a light transmitting ratio and a reflection ratio, the method comprising steps of:

setting the density of the current at a first current density equal to a threshold current density or smaller than and approximately equal to the threshold current density, to deposit the electroplating of a black color, for displaying of the black color of the electroplating;

setting the density of the current at a second current density smaller than the first current density, to deposit the electroplating of a white color, for displaying of the white color of the electroplating, wherein the electroplating of the white color is smooth and the electroplating of the black color is rough; and setting the current to flow in a direction opposite to a direction of the current for forming the electroplating so that the electroplating disappears, for displaying of the color of the reflecting plate, wherein an absolute value of a voltage applied between the first and second electrodes for disappearing of the electroplating is larger than an absolute value of a voltage applied between the first and second electrodes for depositing the electroplating of the black color and an absolute value of a voltage applied between the first and second electrodes for depositing the electroplating of the white color, and the voltage applied between the first and second electrodes for depositing the electroplating of the black color is larger than the voltage applied between the first and second electrodes for depositing the electroplating of the white color; wherein the reflecting plate is a multilayered dielectric film.

10. The driving method according to claim 9, wherein the density of the current at the first current density is set by setting a voltage between the first electrode and second electrode at a first voltage, the density of the current at the second current density is set by setting the voltage at a second voltage different from the first voltage, and the current flows in the direction opposite to the direction of the current for forming the electroplating by setting the voltage at a third voltage different from the first voltage and the second voltage.

* * * * *